(12) United States Patent
Maresh et al.

(10) Patent No.: US 9,053,467 B2
(45) Date of Patent: Jun. 9, 2015

(54) CALENDARING SYSTEM FOR MANAGING FOLLOW-UP APPOINTMENTS

(75) Inventors: Mark Edmund Maresh, Bath, MI (US); Eric Allen Stegner, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 12/426,682

(22) Filed: Apr. 20, 2009

(65) Prior Publication Data

US 2010/0268566 A1   Oct. 21, 2010

(51) Int. Cl.
G06Q 10/00 (2012.01)
G06Q 10/10 (2012.01)

(52) U.S. Cl.
CPC .......... G06Q 10/109 (2013.01); G06Q 10/1095 (2013.01)

(58) Field of Classification Search
USPC .................. 705/7.11–7.42; 715/733–753
See application file for complete search history.

(56) References Cited

U.S. PATENT DOCUMENTS

| | | | | |
|---|---|---|---|---|
| 5,124,912 A * | 6/1992 | Hotaling et al. | ............. | 705/7.19 |
| 5,500,938 A * | 3/1996 | Cahill et al. | .................. | 715/856 |
| 5,732,399 A * | 3/1998 | Katiyar et al. | ............... | 705/7.18 |
| 5,842,009 A * | 11/1998 | Borovoy et al. | ....................... | 1/1 |
| 6,434,571 B1 * | 8/2002 | Nolte | ..................................... | 1/1 |
| 6,732,103 B1 | 5/2004 | Strick et al. | | |
| 7,085,812 B1 | 8/2006 | Sherwood | | |
| 7,149,810 B1 * | 12/2006 | Miller et al. | .................. | 709/246 |
| 7,251,786 B2 | 7/2007 | Wynn et al. | | |
| 7,283,970 B2 | 10/2007 | Cragun et al. | | |
| 7,299,193 B2 | 11/2007 | Cragun et al. | | |
| 7,318,040 B2 | 1/2008 | Doss et al. | | |
| 7,426,543 B2 | 9/2008 | Pfitzner | | |
| 7,499,942 B2 * | 3/2009 | Simison et al. | ........................ | 1/1 |
| 7,679,518 B1 * | 3/2010 | Pabla et al. | ................. | 340/573.1 |
| 7,730,411 B2 | 6/2010 | Chotai et al. | | |
| 7,912,901 B2 * | 3/2011 | Chakra et al. | ................. | 709/204 |
| 7,966,566 B2 * | 6/2011 | Ritter et al. | ................... | 715/753 |
| 8,086,478 B2 * | 12/2011 | Chen et al. | ................... | 705/7.19 |
| 8,589,400 B2 * | 11/2013 | Naeymi-Rad et al. | ........ | 707/738 |
| 8,626,555 B2 * | 1/2014 | Kho et al. | .................... | 705/7.19 |

(Continued)

FOREIGN PATENT DOCUMENTS

| | | |
|---|---|---|
| EP | 1930846 A1 | 6/2008 |
| JP | 2005190497 A | 7/2005 |
| WO | 0028442 A2 | 5/2005 |

OTHER PUBLICATIONS

User's Guide for Microsoft Project for Windows. 95 and Windows 3.1 1995.*

(Continued)

*Primary Examiner* — Alan S Miller
(74) *Attorney, Agent, or Firm* — Yee & Associates, P.C.; Damion Josephs (57) ABSTRACT

A method, apparatus, and computer program product for managing follow-up appointments in a calendaring system. In one illustrative embodiment, a follow-up appointment is created to an original appointment using a processor and responsive to receiving a user input. Information is set for the follow-up appointment created in response to receiving the user input. The follow-up appointment is associated with the original appointment in a data structure stored in a computer readable storage device to form an associated follow-up appointment. The associated follow-up appointment is then stored in the calendaring system.

18 Claims, 8 Drawing Sheets

(56) References Cited

U.S. PATENT DOCUMENTS

| | | | |
|---|---|---|---|
| 2002/0032592 A1* | 3/2002 | Krasnick et al. | 705/8 |
| 2003/0069892 A1* | 4/2003 | Hind et al. | 707/103 X |
| 2003/0149605 A1 | 8/2003 | Cragun et al. | |
| 2004/0078436 A1* | 4/2004 | Demsky et al. | 709/206 |
| 2004/0111307 A1* | 6/2004 | Demsky et al. | 705/8 |
| 2004/0128304 A1 | 7/2004 | Rokosz | |
| 2004/0199580 A1 | 10/2004 | Zhakov | |
| 2004/0215499 A1* | 10/2004 | Leist | 705/8 |
| 2004/0215826 A1* | 10/2004 | Pfitzner | 709/245 |
| 2005/0195747 A1* | 9/2005 | Stamps et al. | 370/241 |
| 2005/0222971 A1* | 10/2005 | Cary | 707/1 |
| 2006/0026051 A1* | 2/2006 | Rose | 705/8 |
| 2007/0239509 A1* | 10/2007 | Kaminsky et al. | 705/9 |
| 2008/0071599 A1 | 3/2008 | Muguda | |
| 2008/0134041 A1* | 6/2008 | Zinn | 715/733 |
| 2008/0141142 A1 | 6/2008 | Lyle et al. | |
| 2008/0189624 A1* | 8/2008 | Chotai et al. | 715/753 |
| 2008/0201196 A1 | 8/2008 | Rowland | |
| 2008/0288323 A1* | 11/2008 | Demsky et al. | 705/9 |
| 2009/0003138 A1* | 1/2009 | Donnelli et al. | 368/28 |
| 2009/0018887 A1 | 1/2009 | Bank et al. | |
| 2009/0125818 A1* | 5/2009 | Ritter et al. | 715/753 |
| 2009/0138283 A1* | 5/2009 | Brown | 705/3 |
| 2010/0070328 A1* | 3/2010 | Motoyama et al. | 705/9 |
| 2010/0268566 A1* | 10/2010 | Maresh et al. | 705/9 |
| 2010/0274619 A1 | 10/2010 | Maresh et al. | |
| 2012/0239451 A1* | 9/2012 | Caligor | 705/7.21 |

OTHER PUBLICATIONS

Modi, Pragnesh Jay, et al. "Cmradar: A personal assistant agent for calendar management." Agent-Oriented Information Systems II. Springer Berlin Heidelberg, 2005. 169-181.*

Greif, Irene, and Sunil Sarin. "Data sharing in group work." ACM Transactions on Information Systems (TOIS) 5.2 (1987): 187-211.*

Turner, Christopher J., et al. "Visual constraint diagrams: Runtime conformance checking of UML object models versus implementations." Automated Software Engineering, 2003. Proceedings. 18th IEEE International Conference on. IEEE, 2003.*

Prasad, Sushil K., et al. "Implementation of a calendar application based on SyD coordination links." Parallel and Distributed Processing Symposium, 2003. Proceedings. International. IEEE, 2003.*

Office Action issued on Aug. 11, 2011 for U.S. Appl. No. 12/429,701, 19 pages.

Final office action dated Jun. 7, 2013 regarding U.S. Appl. No. 12/429,701, 19 pages.

Final Office Action regarding U.S. Appl. No. 12/429,701, dated Jan. 27, 2012, 16 pages.

Final Office Action issued on Jan. 27, 2012 for U.S. Appl. No. 12/429,701, 16 pages.

Office Action issued on Nov. 19, 2012 for U.S. Appl. No. 12/429,701, 22 pages.

* cited by examiner

CALENDARING SYSTEM FOR MANAGING FOLLOW-UP APPOINTMENTS

BACKGROUND

1. Field

The disclosure relates generally to an improved data processing system and more specifically to a method and apparatus for managing a calendaring system. Still more particularly, the illustrative embodiments provide a method, apparatus, and computer program for managing follow-up appointments in an improved calendaring system.

2. Description of the Related Art

A calendaring system maintains information associated with one or more events. An event in the calendaring system may be in the past, the present, or the future. A calendaring system may be implemented on one or more data processing systems in hardware, software, or a combination of hardware and software. An example of how a calendaring system may be implemented is through one or more calendaring servers and one or more calendaring clients. One example of such an implementation is a calendaring server that stores the information associated with the events of one or more users. In the example of a calendaring server, one or more users may employ one or more calendaring clients. The calendaring clients, which may be implemented in a Web browser or one or more executables in an operating system, may process interaction with the user and may send and receive communications to the calendaring server. The calendaring server that may receive the requests may be implemented using one or more executables in an operating system or a Web server. Examples of requests that may be received by the calendaring server are a request to create an appointment, a request to modify an appointment, and a request for the information associated with one or more events the user has requested.

People frequently make use of a calendaring system in managing their schedules, such as appointments. Calendaring systems store the appointments of a particular user and display the appointments in such a way that the user can manage the user's time. Calendaring systems also allow the user to manage the scheduling of an appointment involving multiple users using appointment requests. The user who wishes to schedule the appointment creates an appointment request in the calendaring system and provides a listing of other users to be invited to the appointment.

Items discussed at an appointment may not be resolved during the appointment. As a result, additional appointments may be needed to resolve those items. Examples of such items include items that require further decisions based on the passage of time and items that could not be resolved due to time constraints at the first appointment. One more specific example is a budget appointment. Three topics may be on the appointment agenda for discussion. When the budget appointment is held by the attendees, the allotted time for the appointment may expire before one of the three scheduled items are discussed. In that example, a second budget appointment may be needed to address the remaining scheduled item. Additionally, status updates on the two scheduled items discussed at the first budget appointment may require additional discussion, such as a progress update.

With the need to hold additional appointments, a user in the calendaring system may create a new appointment request and re-invite the other users for each of the additional appointments.

SUMMARY

One or more illustrative embodiments provide a method, system, and computer program product for managing follow-up appointments in a calendaring system. In one illustrative embodiment, a follow-up appointment is created to an original appointment using a processor and responsive to receiving a user input. Information is set for the follow-up appointment created in response to receiving the user input. The follow-up appointment is associated with the original appointment in a data structure stored in a computer readable storage device to form an associated follow-up appointment. The associated follow-up appointment is then stored in the calendaring system.

DETAILED DESCRIPTION

As will be appreciated by one skilled in the art, the present invention may be embodied as an apparatus, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "apparatus." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
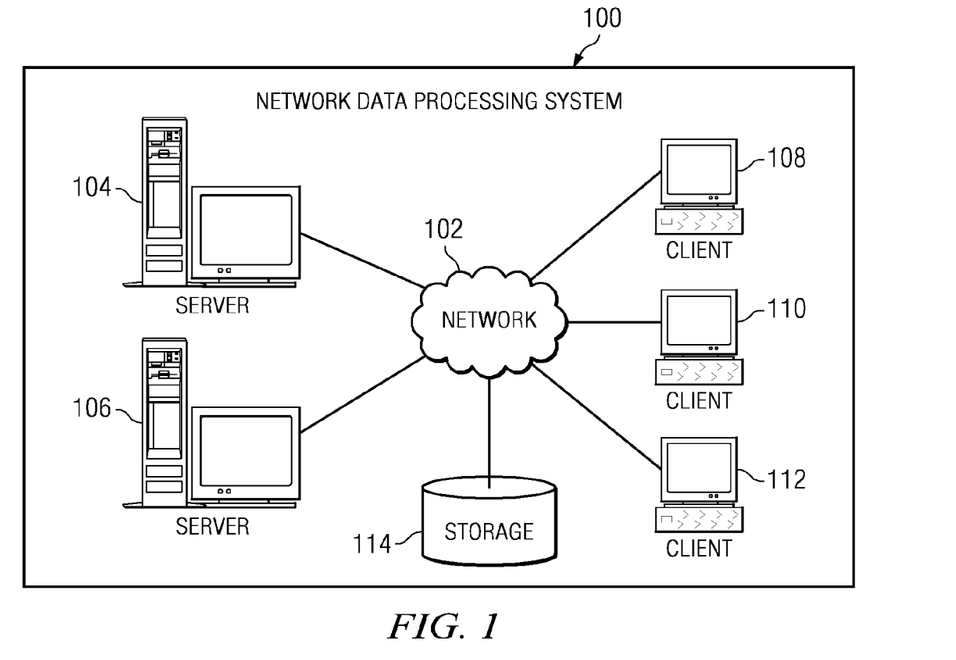
FIG. 1 is a pictorial representation of a network of data processing systems in which illustrative embodiments may be implemented.

FIG. 1 is a pictorial representation of a network of data processing systems in which illustrative embodiments may be implemented. Network data processing system 100 is a network of computers in which the illustrative embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server computer 104 and server computer 106 connect to network 102. In addition, client computers 108, 110, and 112 connect to network 102. Storage unit 114 may also connect to network 102. Client computers 108, 110, and 112 may be, for example, personal computers or network computers. In the depicted example, server computer 104 provides data, such as boot files, operating system images, and applications to client computers 108, 110, and 112. Client computers 108, 110, and 112 are clients to server computer 104 in this example. Network data processing system 100 may include additional server computers, client computers, and other devices not shown. A calendaring system may be implemented in network data processing system 100 using a calendaring server executing on server computer 104, server computer 106, or both, and a calendaring client executing on one or more of client computers 108, 110, and 112. Alternatively, server computer 104 and client computer 108 may instead be located within the same physical machine.

Program code located in network data processing system 100 may be stored on a computer recordable storage medium and downloaded to a data processing system or other device for use. For example, program code may be stored on a computer recordable storage medium on server computer 104 and downloaded to client computer 108 over network 102 for use on client computer 108.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example and not as an architectural limitation for the different illustrative embodiments.

Figure 2:
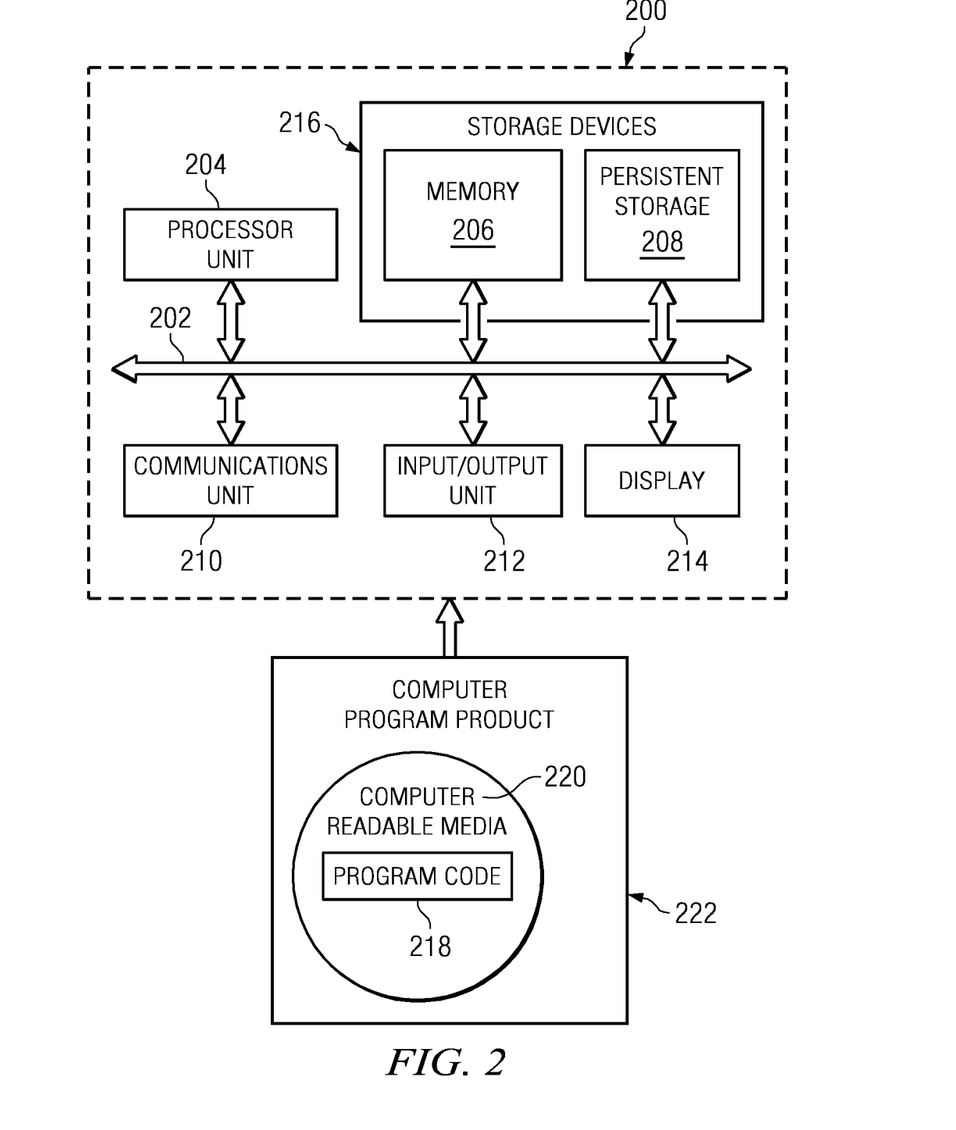
FIG. 2 is a diagram of a data processing system in which illustrative embodiments may be implemented.

With reference to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communication links.

Input/output unit 212 allows for input and output of data with other devices that may be connected to data processing system 200. For example, input/output unit 212 may provide a connection for user input through a keyboard, a mouse, and/or some other suitable input device. Display 214 provides a mechanism to display information to a user.

Instructions for the operating system, applications and/or programs may be located in storage devices 216, which are in communication with processor unit 204 through communications fabric 202. Programs located in one or more of storage devices 216 and in communication with processor unit 204 through communications fabric 202 may be, for example, one or more calendaring servers and calendaring clients. In these illustrative examples the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206. The computer implemented instructions may cause processing unit 204 to provide a calendaring server, a calendaring client, or both.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communication link and/or the connection may be physical or wireless in the illustrative examples. The computer readable media also may take the form of non-tangible media, such as communication links or wireless transmissions containing the program code.

In some illustrative embodiments, program code 218 may be downloaded over a network to persistent storage 208 from another device or data processing system for use within data processing system 200. For instance, a program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different illustrative embodiments recognize and take into account a number of considerations. For example, the different illustrative embodiments recognize that when the user wishes to schedule a follow-up appointment using the calendaring system, the user has two choices. First, the user may change the date and time of the original appointment to correspond with the requested date and time for the follow-up appointment. However, this removes the original appointment from the user's calendar and makes tracking past appointments difficult or impossible. Second, the user may create a new appointment request in the calendaring system.

The illustrative embodiments recognize that creating a new appointment request has the following disadvantages: (1) information in the appointment request must be replicated between the original appointment and the follow-up appointment, such as attendees and agenda; and (2) the user cannot obtain a visual representation of related appointments even if the user was invited to the original appointment and the follow-up appointment.

Thus the illustrative embodiments provide a method, apparatus, and a computer program product to manage follow-up appointments in a calendaring system. One or more illustrative embodiments create a number of follow-up appointments, duplicating information into the follow-up appointments from the original appointment, and displaying a visual representation of original appointments with their associated follow-up appointments, even if the user was not invited to one or more of the prior appointments. A number as used herein to refer to items means one or more items. For example, a number of follow-up appointments are one or more follow-up appointments.

Figure 3:
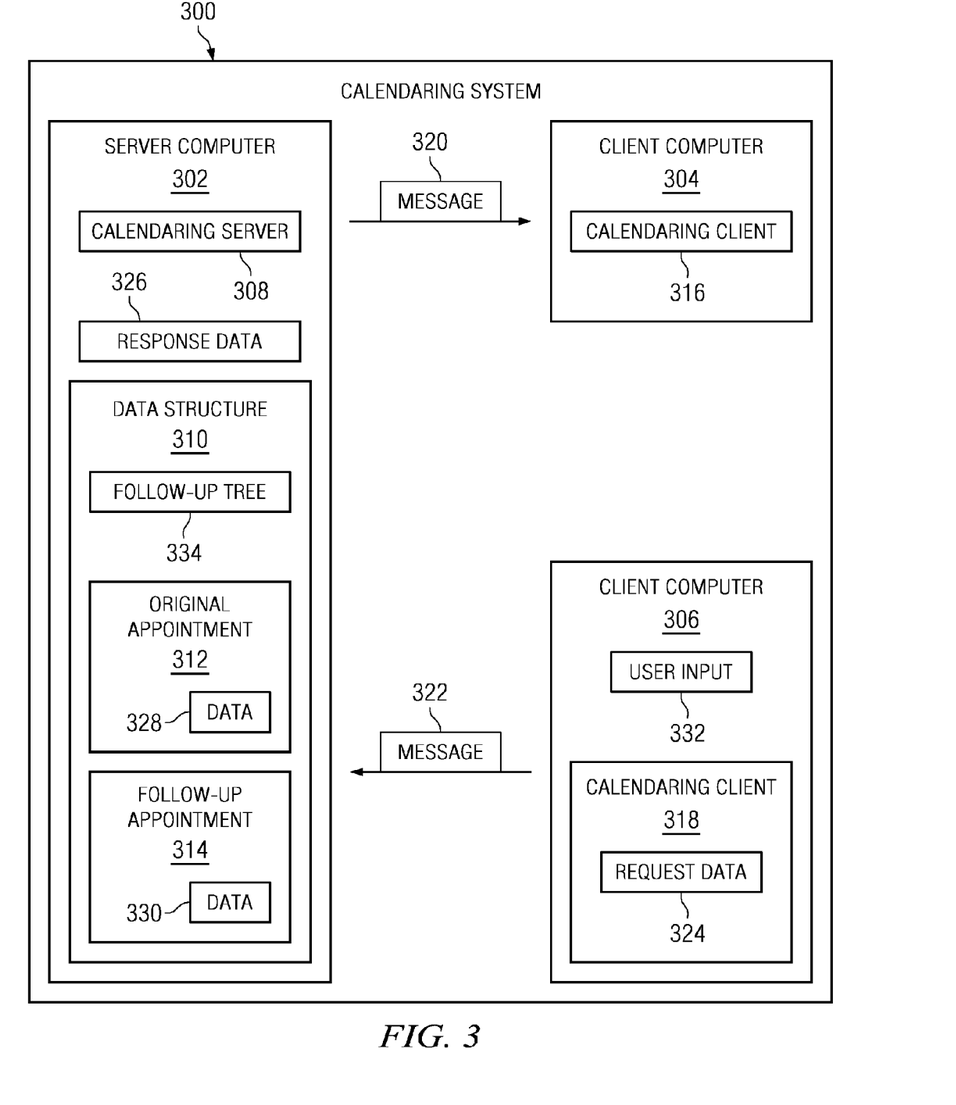
FIG. 3 is a block diagram of a calendaring system in accordance with an illustrative embodiment.

With reference to FIG. 3, a block diagram of a calendaring system is depicted in accordance with an illustrative embodiment. In illustrative examples, calendaring system 300 may implement a number of illustrative embodiments that provide for managing follow-up appointments within calendaring system 300 in these examples. In one illustrative example, network data processing system 100 implements calendaring system 300.

As depicted, calendaring system 300 includes server computer 302 and client computers 304 and 306. Client computers 304 and 306 are illustrative as to the number of client computers that may be present in calendaring system 300 and should not be construed as an architectural limitation. Client computers 304 and 306 may also be implemented in one or more of client computers 108, 110, and 112. Server computer 302 executes calendaring server 308. Server computer 302 may be an example of server computer 104. Calendaring server 308 may be a software component running on server computer 302. Calendaring server 308 may be located on one server computer 302 or spread across more than one server computer 302, and the depiction of one server computer 302 should not be construed as an architectural limitation. Data structure 310 may be stored on server computer 302 and may be accessed by calendaring server 308. Data structure 3010 may be used to maintain an association between original appointment 312 and follow-up appointment 314. Original appointment 312 may contain appointment data 328, while follow-up appointment 314 may contain appointment data 330. Server computer 302 may communicate with client computers 304 and 306. Client computer 304 executes calendaring client 316. Likewise, client computer 306 may execute calendaring client 318. Client computer 306 may receive user input 332. Client computers 304 and 306 may communicate with server computer 302 by sending and receiving messages, such as messages 320 and 322. Messages 320 and 322 may, for example, be sent over network 102. Follow-up tree 334 is an example of a data structure 310, which may contain other original appointments 312 and follow-up appointments 314.

For example, calendaring client 318 may create an original appointment 312 on server computer 302. Calendaring client 318 gathers request data 324 for the request and causes client computer 306 to communicate message 322 to server computer 302. An example of gathering data for the request is accepting user input 332 from a user. The request data 324 may be, for example, an appointment ID, an appointment date and appointment time, an agenda, a list of invitees, or any combination thereof. Request data 324 may be communicated to server computer 302 using one or more messages 322.

As an additional example, calendaring server 308 may cause server computer 302 to communicate message 320 to client computer 304. Message 320 may contain response data 326. Response data 326 may include, for example, data structure 310, original appointment 312, follow-up appointment 314, or any combination thereof. Client computer 304 may receive message 320 and pass message response data 326 to calendaring client 318. Calendaring client 318 may display response data 326 to the user.

The illustration of calendaring system 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, server computer 302 contains one or more calendaring servers 308, and one or more calendaring clients 316. Additionally, client computers 304 and 306 may each contain one or more calendaring servers 308 and calendaring clients 316. Although client computer 304 is depicted as receiving message 320 from server computer 302, client computer 304 may also send message 320 to server computer 302. Likewise, although client computer 306 is depicted as sending message 322 to server computer 302, client computer 306 may also receive message 322 from server computer 302.

Figure 4:
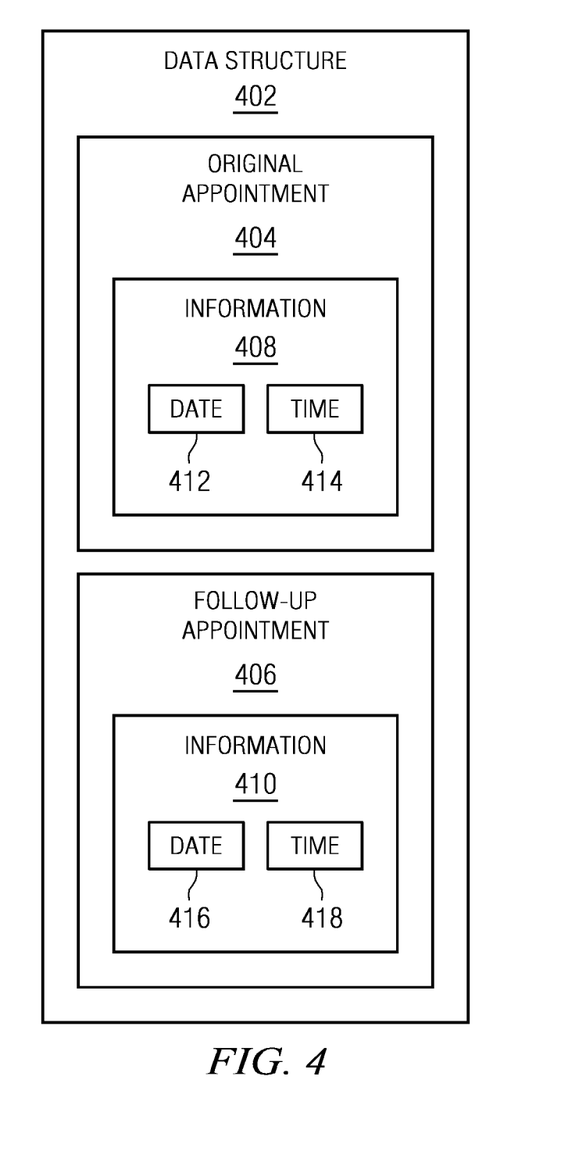
FIG. 4 is a block diagram of a data structure in accordance with an illustrative embodiment.

Turning to FIG. 4, a block diagram of a data structure 402 is depicted in accordance with an illustrative embodiment. Data structure 402 maintains an association between original appointment 404 and follow-up appointment 406. Data structure 402 may be an illustrative example of data structure 310. Data structure 402 may be, for example, a bi-directionally linked tree, a singly-linked tree, a tree index, a hashing table, or a relation in a relational database. Original appointment 404 and follow-up appointment 406 may each have additional follow-up appointments in accordance with an illustrative embodiment, and the depiction of one follow-up appointment 406 should not be construed as an architectural limitation. Original appointment 404 may be an illustrative example of original appointment 312, while follow-up appointment 406 may be an illustrative example of follow-up appointment 314. Original appointment 404 contains information 408 and follow-up appointment contains information 410. Information 408 may be an example of appointment data 328, and information 410 may be an example of appointment data 330. Information 408 may be details of original appointment 404, while information 410 may be details of follow-up appointment 406. Examples of information 408 are the date of the appointment 412, the time of the appointment 414, attendees, and an agenda. Examples of information 410 are the date of the appointment 416, the time of the appointment 418, attendees, an agenda, and a progress report on topics discussed during original appointment 404.

The illustration of data structure 402 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, data structure 402 may contain a number of original appointments 404 and follow-up appointments 406. Data structure 402 may also be empty or contain only a number of original appointments 404. Original appointment 404 may contain a number of information 408. Likewise, follow-up appointment 406 may contain a number of information 410.

Figure 5:
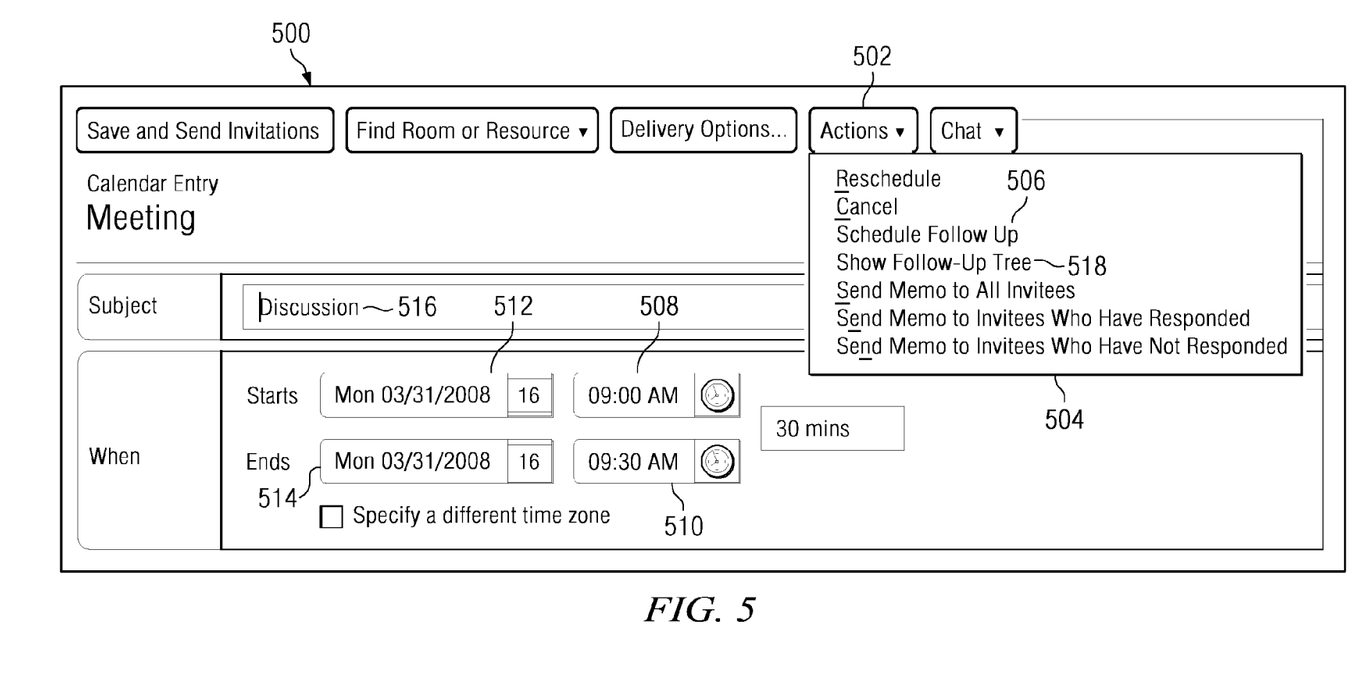
FIG. 5 is an illustration of a graphical user interface displaying an appointment in accordance with an illustrative embodiment.

Turning to FIG. 5, an illustration of a graphical user interface displaying an appointment is depicted in accordance with an illustrative embodiment. In this example, the user has pressed button 502 to reveal menu 504 in graphical user interface 500. Menu option 506 initiates the creation of a follow-up appointment to the appointment currently in view in the screenshot. The start time 508, end time 510, start date 512, end date 514, and subject 516 of the appointment are also visible, and in one embodiment, are duplicated into the follow-up appointment created as a result of selecting menu option 506. Selecting menu option 518 will initiate the display of the data structure associated with this appointment. In one embodiment, the data structure is a bi-directionally linked tree.

Figure 6:
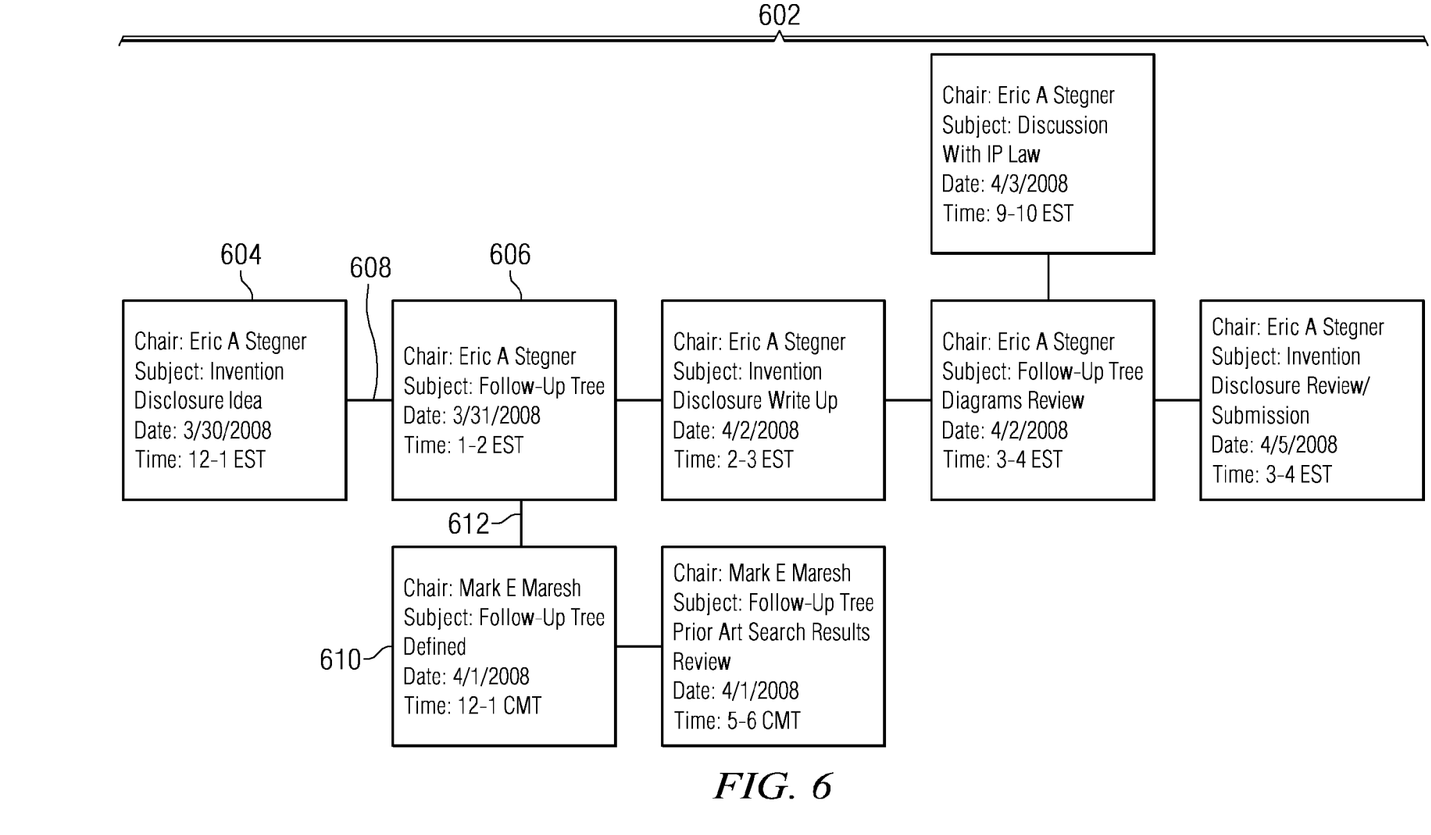
FIG. 6 is a screenshot of a graphical user interface displaying a bi-directionally linked tree of appointments in accordance with an illustrative embodiment.

With reference to FIG. 6, a screenshot of a graphical user interface displaying a bi-directionally linked tree of appointments in accordance with an illustrative embodiment is depicted. The tree 602 visualizes the association between original appointment 604 and follow-up appointment 606 with link 608. In accordance with one embodiment, follow-up appointment 606 also has a follow-up appointment 610 associated to follow-up appointment 606 with link 612.

Figure 7:
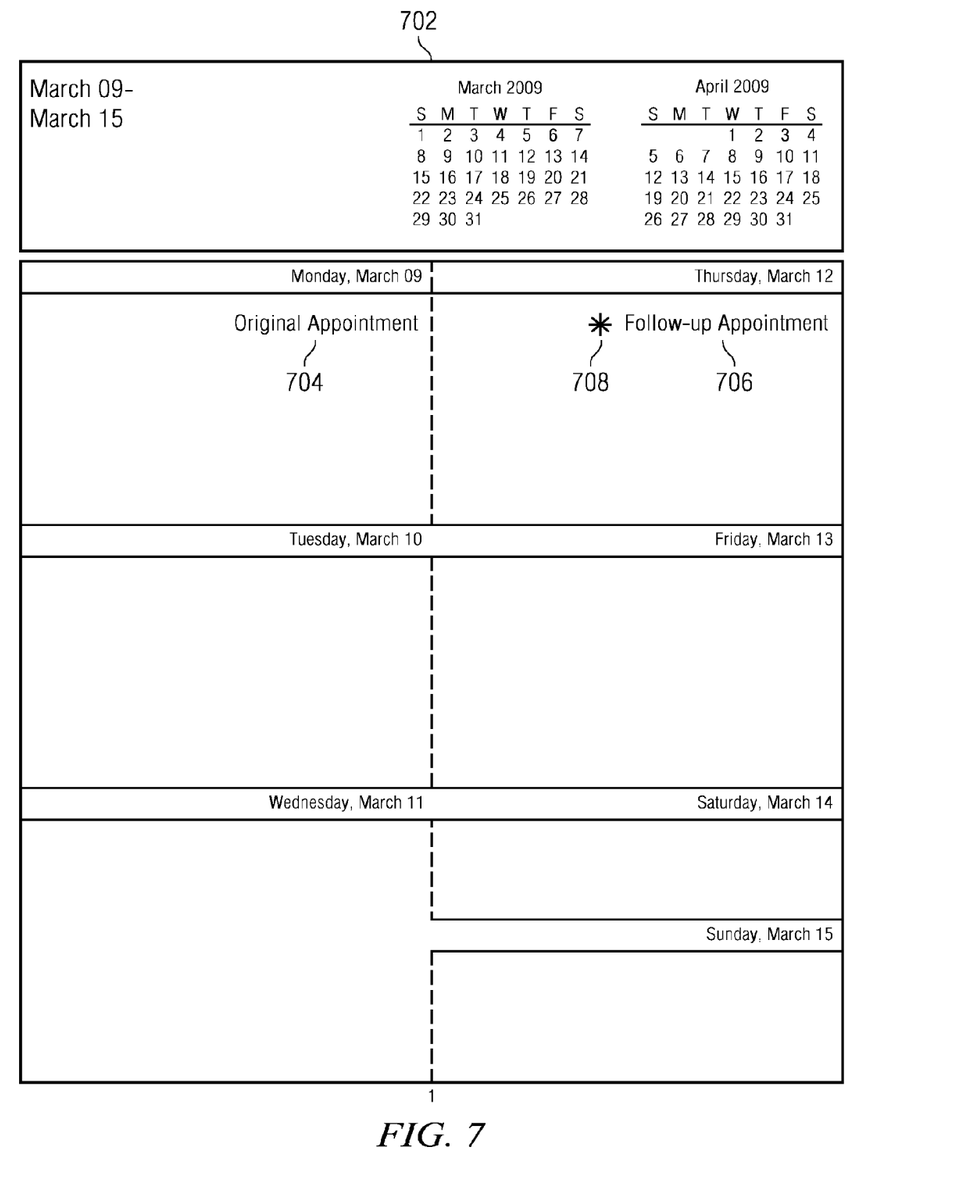
FIG. 7 is a screenshot of a graphical user interface displaying a calendar view of appointments in accordance with an illustrative embodiment.

With reference to FIG. 7, a screenshot of a graphical user interface displaying a calendar view of appointments in accordance with an illustrative embodiment is depicted. The calendar view 702 contains original appointment 704 and follow-up appointment 706. An identifier 708 is displayed by the calendaring system near follow-up appointment 706 to indicate to the user that follow-up appointment 706 is a follow-up appointment. The identifier may be a graphical symbol or one or more textual characters. The identifier 708 may differentiate the follow-up appointment from an original appointment or other follow-up appointments in the calendar view. For example, each follow-up appointment 706 may be displayed with a different identifier 708 in calendar view 702. The identifier 708 may be activated by the user to display the data structure in accordance with tree 602 in FIG. 6. By way of example, the user may activate identifier 708 by using a keyboard command or by using a mouse to click on identifier 708.

The illustration of graphical user interfaces 500, 600, and 700 in FIGS. 5, 6, and 7, respectively, is not meant to imply physical or architectural limitations to the manner in which different advantageous embodiments may be implemented. Other interfaces and interface elements in addition and/or in place of the ones illustrated may be used. Some interface elements may be unnecessary in some advantageous embodiments. Also, the interface elements are presented to illustrate some functional components. One or more of these interface elements may be combined and/or divided into different interface elements when implemented in different advantageous embodiments.

Figure 8:
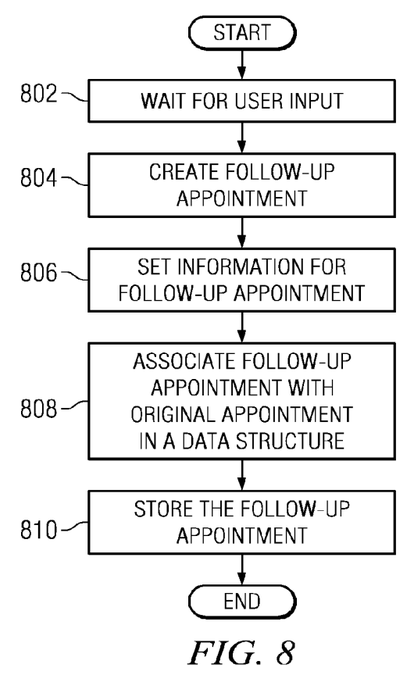
FIG. 8 is a flowchart of a process for creating a follow-up appointment on a calendaring server in accordance with an illustrative embodiment.

With reference to FIG. 8, a flowchart of a process for creating a follow-up appointment on a calendaring server is depicted in accordance with an illustrative embodiment. The process begins when a user input is received (802). The process may be carried out using calendaring server 308. The user input may be a request to create a follow-up appointment. The request may also include an identification of the original appointment from which the user desires to create the follow-up appointment. The user input may be received as a request from the calendaring client. The server then creates the follow-up appointment (804). The information for the follow-up appointment is then set (806). Setting the information may be, for example, entering the information by the user in one or more data fields or automatically duplicating some or all of the information from the original appointment. The user may enter the information in a graphical user interface or a command line interface. The follow-up appointment is then associated with the original appointment in a data structure (808). The follow-up appointment is then stored in the calendaring system (810) with the process terminating thereafter.

Figure 9:
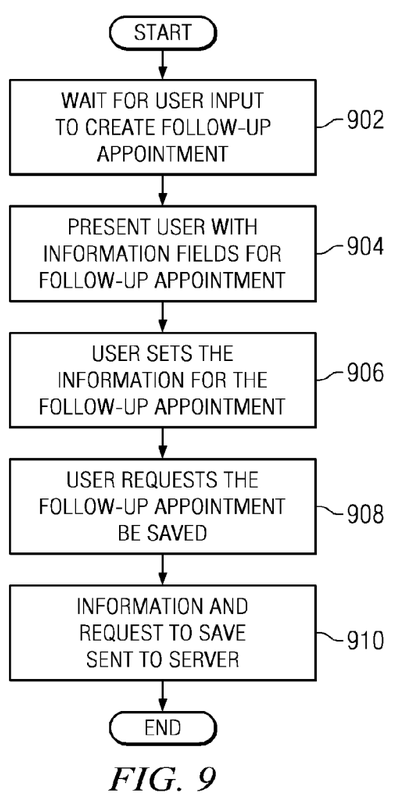
FIG. 9 is a flowchart of a process for creating a follow-up appointment using a calendaring client in accordance with an illustrative embodiment.

Turning now to FIG. 9, a flowchart of a process for creating a follow-up appointment using a calendaring client is depicted in accordance with an illustrative embodiment. In one illustrative embodiment, the process may be carried out by calendaring client 316 or 318. The process begins when a user input is received for scheduling a follow-up appointment (902). The user input may be selecting a menu option, pressing a graphical button, or entering a command. The user input may also designate an original appointment with which the follow-up appointment is associated. The calendaring client then presents the user with information fields for the follow-up appointment (904). A number of information fields may be filled in automatically by the calendaring client based on information from the original appointment. The user then sets the information for the follow-up appointment (906) and requests the follow-up appointment (906) be saved (908). The information may be set by the user, partially duplicated, or fully duplicated from the original appointment. The calendaring client sends the information and request to save the follow-up appointment to the calendaring server (910) and the process ends.

Figure 10:
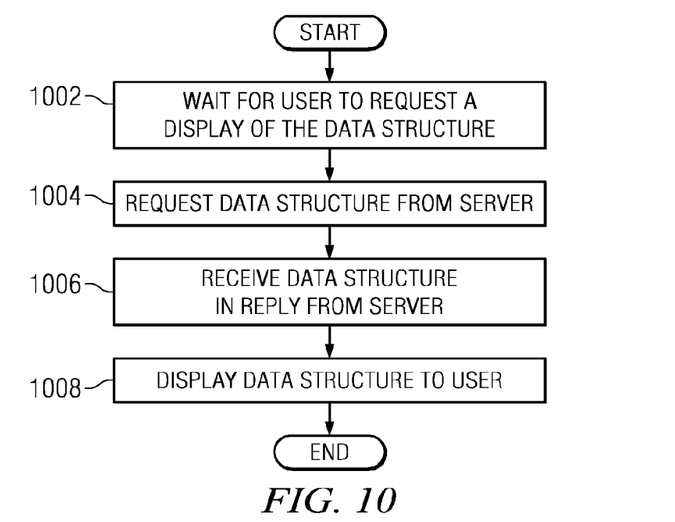
FIG. 10 is a flowchart of a process for displaying a data structure associated with a specified appointment using a calendaring client in accordance with an illustrative embodiment.

With reference to FIG. 10, a flowchart of a process for displaying a data structure associated with a specified appointment using a calendaring client is depicted in accordance with an illustrative embodiment. The process may be carried out by calendaring client 316 or 318. The process begins when a user requests display of a data structure (1002). The request may include an identification of the appointment with which the requested data structure is associated. The calendaring client requests the data structure from the calendaring server (1004). The request may include the identification of the appointment associated with the requested data structure. The calendaring client then receives the data structure in a response from the server (1006) and displays the data structure to the user (1008).

Figure 11:
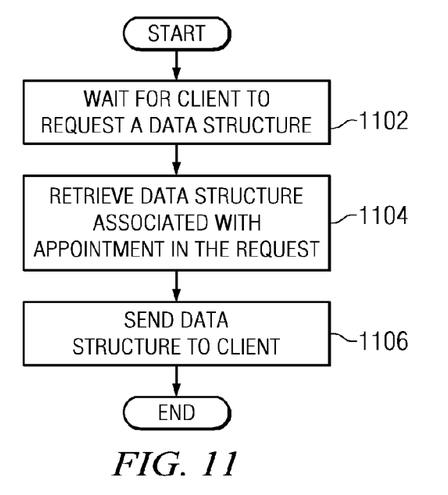
FIG. 11 is a flowchart of a process for retrieving, on the calendaring server, a data structure requested by the calendaring client in accordance with an illustrative embodiment.

With reference to FIG. 11, a flowchart of a process for retrieving, on the calendaring server, a data structure requested by the calendaring client is depicted in accordance with an illustrative embodiment. The process may be carried out by calendaring server 308. The process begins when a client requests a data structure (1102). The request may contain an identifier of an appointment associated with the data structure or an identifier of the data structure itself. The calendaring server retrieves the requested data structure (1104). Then, the calendaring server sends the requested data structure to the client (1106). The process then ends.

The one or more illustrative embodiments provide a capability to manage follow-up appointments to an original appointment in a calendaring system, thereby enabling a user of the calendaring system to create and display original appointments and associated follow-up appointments. Creating follow-up appointments as provided for in the one or more illustrative embodiments enable a user to create an appointment with some information duplicated from the original appointment, thus, decreasing the effort necessary by the user in creating the appointment. Displaying original appointments and follow-up appointments as provided for in the illustrative embodiments enable a user to view the information for a number of associated appointments simultaneously and in a graphically meaningful way. Displaying original appointments and follow-up appointments as provided for in the illustrative embodiments decrease the time and effort required by the user to track appointment information that may be relevant to the follow-up appointment but is associated with a prior appointment.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing follow-up appointments in a calendaring system, comprising:
    responsive to receiving a user input, creating, by a processor unit, a first follow-up appointment to an original appointment;
    setting, by the processor unit, first follow-up information for the first follow-up appointment created using selected original information about the original appointment including an appointment ID and in response to receiving the user input;
    storing, by the processor unit, the first follow-up information with the original information about the original appointment in a bi-directionally linked data structure stored in a computer readable storage device to form an associated follow-up appointment;
    storing, by the processor unit, the associated follow-up appointment in the calendaring system;
    creating, by the processor unit, a second follow-up appointment to the first follow-up appointment;

setting, by the processor unit, second follow-up information for the second follow-up appointment created in response to receiving the user input;

storing, by the processor unit, the second follow-up information with original information about the original appointment and the first follow-up information of the associated follow-up appointment in a bi-directionally linked data structure stored in a computer readable storage device to form a second associated follow-up appointment;

storing, by the processor unit, the associated follow-up appointments in the calendaring system; and in response to receiving a request from the user to initiate display of a data structure associated with a particular appointment and when the particular appointment is the original appointment, displaying, by the processor unit, a diagram that includes the original appointment and the original information, the first follow-up appointment and the first follow-up information, and the second follow-up appointment and second follow-up information about the second follow-up appointment, wherein the diagram displays a first graphical depiction of a first relationship between the original appointment and the first follow-up appointment, and wherein the diagram displays a second graphical depiction of a second relationship between the first follow-up appointment and the second follow-up appointment.

2. The method of claim 1, wherein the original appointment and the first follow-up appointment occur on different days.

3. The method of claim 1, wherein the bi-directionally linked data structure is a follow-up bi-directionally linked tree.

4. The method of claim 1, further comprising:
responsive to creating the first follow-up appointment, placing the original information in the first follow-up appointment.

5. The method of claim 1, wherein the diagram is a block diagram.

6. The method of claim 1, further comprising displaying each entry of the bi-directionally linked data structure, wherein each entry of the bi-directionally linked data structure is displayed when the user is an invitee to any of a plurality of other appointments in a follow-up tree.

7. The method of claim 1, wherein the user input is a first user input, and wherein setting a date and a time for the first follow-up appointment is performed based on a second user input.

8. The method of claim 1, wherein the first follow-up information for the first follow-up appointment is modified by the user.

9. A computer program product comprising:
a non-transitory computer readable storage medium including computer usable program code encoded thereon for managing follow-up appointments in a calendaring system, the computer program product including instructions when executed on a processor unit of a computer direct the computer to:
responsive to receiving a user input, create, using the processor unit, a first follow-up appointment to an original appointment;
set using the processor unit, first follow-up information for the first follow-up appointment created using selected original information about the original appointment including an appointment ID and in response to receiving the user input;
store using the processor unit, the first follow-up information with the original information about the original appointment in a bi-directionally linked data structure stored in a computer readable storage device to form an associated follow-up appointment;
store using the processor unit, the associated follow-up appointment in the calendaring system;
create, by the processor unit, a second follow-up appointment to the first follow-up appointment;
set, using the processor unit, second follow-up information for the second follow-up appointment created in response to receiving the user input;
store, using the processor unit, the second follow-up information with original information about the original appointment and the first follow-up information of the associated follow-up appointment in a bi-directionally linked data structure stored in a computer readable storage device to form a second associated follow-up appointment;
store, using the processor unit, the associated follow-up appointments in the calendaring system; and
in response to receiving a request from the user to initiate display of a data structure associated with a particular appointment and when the particular appointment is the original appointment, display using the processor unit, a diagram that includes the original appointment and the original information, the first follow-up appointment and the first follow-up information, and the second follow-up appointment and second follow-up information about the second follow-up appointment, wherein the diagram displays a first graphical depiction of a first relationship between the original appointment and the first follow-up appointment, and wherein the diagram displays a second graphical depiction of a second relationship between the first follow-up appointment and the second follow-up appointment.

10. The computer program product of claim 9, wherein the bi-directionally linked data structure is a follow-up bi-directionally linked tree.

11. The computer program product of claim 9, responsive to creating the first follow-up appointment, placing the original information in the first follow-up appointment.

12. The computer program product of claim 9, wherein the diagram is a block diagram.

13. The computer program product of claim 9, further comprising displaying each entry of the bi-directionally linked data structure, wherein each entry of the bi-directionally linked data structure is displayed when the user is an invitee to any of a plurality of other appointments in a follow-up tree.

14. An apparatus, comprising:
a bus system;
a storage device connected to the bus system, wherein the storage device includes program code; and
a processor unit connected to the bus system, wherein the processor unit executes the program code to direct the apparatus to:
create, using a processor unit, a first follow-up appointment to an original appointment in response to receiving a user input;
set, using the processor unit, first follow-up information for the first follow-up appointment created using selected original information about the original appointment including an appointment ID and in response to receiving the user input;
store, using the processor unit, the first follow-up information with the original information about the original appointment in a bi-directionally linked data structure stored in a computer readable storage device to form an associated follow-up appointment;

store, using the processor unit, the associated follow-up appointment in the calendaring system;

create a second follow-up appointment to the first follow-up appointment;

set, using the processor unit, second follow-up information for the second follow-up appointment created in response to receiving the user input;

store, using the processor unit, the second follow-up information with original information about the original appointment and the first follow-up information of the associated follow-up appointment in a bi-directionally linked data structure stored in a computer readable storage device to form a second associated follow-up appointment;

store, using the processor unit, the associated follow-up appointments in the calendaring system; and in response to receiving a request from the user to initiate display of a data structure associated with a particular appointment and when the particular appointment is the original appointment, display, using the processor unit, a diagram that includes the original appointment and the original information, the first follow-up appointment and the first follow-up information, and the second follow-up appointment and second follow-up information about the second follow-up appointment, wherein the diagram displays a first graphical depiction of a first relationship between the original appointment and the first follow-up appointment, and wherein the diagram displays a second graphical depiction of a second relationship between the first follow-up appointment and the second follow-up appointment.

15. The apparatus of claim 14, wherein the bi-directionally linked data structure is a follow-up bi-directionally linked tree.

16. The apparatus of claim 14, responsive to creating the first follow-up appointment, placing the original information in the first follow-up appointment.

17. The apparatus of claim 14, wherein the diagram is a block diagram.

18. The apparatus of claim 14, further comprising displaying each entry of the bi-directionally linked data structure, wherein each entry of the bi-directionally linked data structure is displayed when the user is an invitee to any of a plurality of other appointments in a follow-up tree.

* * * * *